July 13, 1965  R. G. HEYL, JR  3,194,530
SEAT ADJUSTER
Filed May 9, 1963
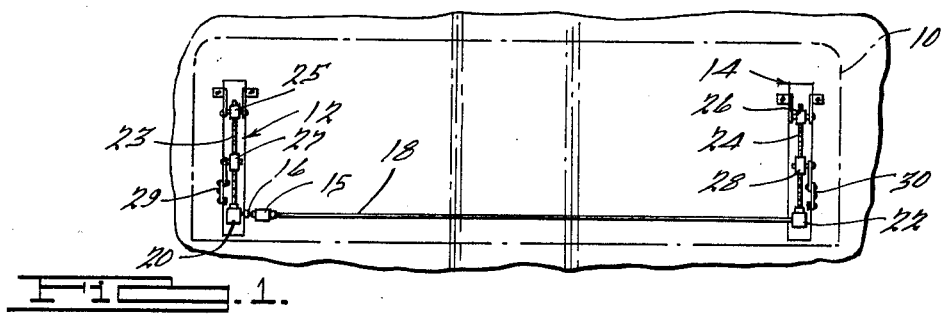
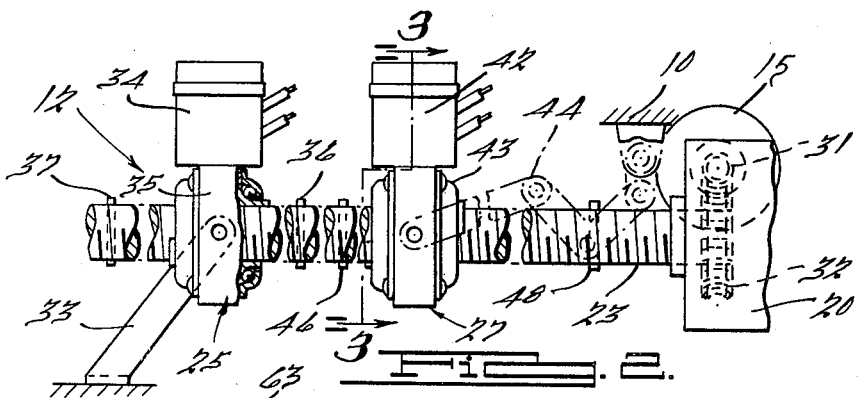
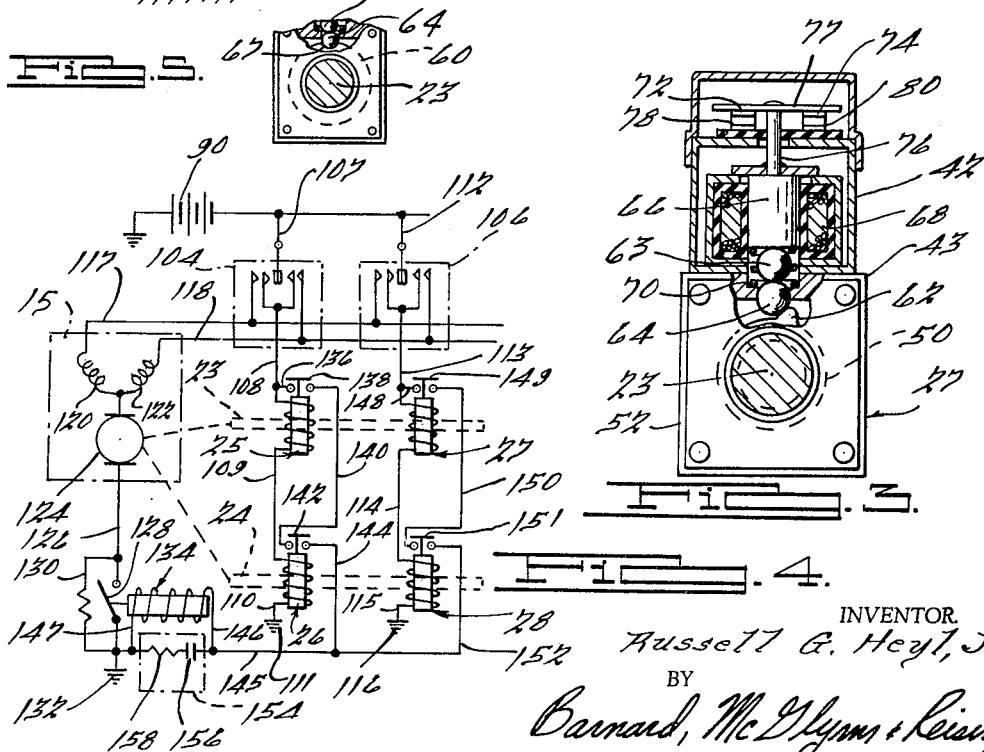
INVENTOR.
Russell G. Heyl, Jr.
BY
Barnard, McGlynn & Reising
ATTORNEYS

United States Patent Office 3,194,530
Patented July 13, 1965

3,194,530
SEAT ADJUSTER
Russell G. Heyl, Jr., Birmingham, Mich., assignor to American Metal Products Company, Detroit, Mich., a corporation of Michigan
Filed May 9, 1963, Ser. No. 279,136
10 Claims. (Cl. 248—419)

This invention relates to seat adjuster apparatus, and more particularly to seat adjuster control means for use on vehicle seats and the like.

In the automotive industry, the front seats of a vehicle are conventionally provided with spaced adjuster units which cooperatively adjustably support the seat relative to the vehicle floor. Many adjuster units are designed to provide four or six-way adjustment whereby the seat is adapted to be moved horizontally, forwardly and rearwardly, vertically, upwardly and downwardly, and sometimes tilted by unequal vertical movement at the front and rear of the seat. Although mechanical seat adjusters have been proposed, the majority of multiway seat adjusters currently used are powered by means of electric motors.

One common type of electrically driven seat adjuster utilizes jack screw and jack nut elements. An electric motor is drivingly connected to one of the elements to obtain relative movement therebetween. Whether a jack screw, a jack nut, or some other drive mechanism is being utilized, problems of misalignment occur between the mechanisms of the spaced adjuster units. In order to conserve space and to decrease costs, most electric adjuster units currently in use utilize a single electric motor which is drivingly connected by one or more flexible cables to the operating mechanisms of each adjuster unit. It is desirable to simultaneously actuate the adjuster units and obtained identical movement at both sides of the seat. However, heretofore, the adjuster units have lacked a control means to prevent misalignment of corresponding parts of spaced adjuster units during operation. For example, the apparatus provided for horizontal adjustment at one adjuster unit may become misaligned relative to the position of corresponding horizontal adjustment apparatus provided at the other adjuster unit. Consequently, the desired seat position may not be attained as rapidly as desired, or may not be attained at all, and, further, serious damage can occur to the various parts during operation in a condition of misalignment.

Accordingly, it is a primary object of the present invention to provide a new and improved control system for seat adjuster units resulting in simultaneous operation of spaced seat adjuster units in unison with controlled alignment relative to one another.

A further object is to provide a new and improved seat adjuster mechanism which may be automatically variably adjusted to attain predetermined relationships between various adjuster mechanism parts.

A further object of the present invention is to provide a jack nut and screw arrangement for a seat adjuster unit with which corresponding parts of spaced adjuster units can be maintained in alignment relative to one another during various adjustment positions and conditions.

A more specific object is to provide a new and improved jack nut and solenoid arrangement which insures accurate alignment of the jack nut relative to the solenoid at the beginning and end of a seat adjustment operation.

Still another object is to provide a seat adjuster control system which will prevent operation of the adjuster unit at such times as when the adjuster units would otherwise tend to become misaligned and when serious damage to the adjuster units would result.

The advantages of the present invention will be apparent from the following detailed description of the inventive principles disclosed by a reference to the accompanying drawing of an illustrative embodiment of the invention wherein:

FIGURE 1 is a diagrammatic view of a seat adjuster arrangement;

FIGURE 2 is a side elevational view of a seat adjuster unit embodying the principles of the present invention;

FIGURE 3 is a sectional view taken along the line 3—3 in FIGURE 2;

FIGURE 4 is a diagrammatic illustration of the control apparatus adapted to be utilized with the seat adjuster mechanism shown in FIGURES 1–3; and FIGURE 5 is a side elevational view of an alternative jack nut embodiment.

Referring now to FIGURE 1, a plan view of a vehicle seat 10 is shown in phantom in supported position above spaced adjuster units 12, 14 which are secured to the vehicle floor and adapted to cooperatively and simultaneously move the vehicle seat to various positions. The adjuster units are, except as otherwise pointed out in detail hereinafter, conventional in design and, in general, illustrative of various other designs adapted to provide vertical and horizontal adjustment of a seat. In the illustrative embodiment, a reversible electric motor 15 actuates the adjuster units through flexible cable means 16, 18 which may be connected to the adjuster unit in a conventional manner by worm and gear arrangements in housings 20, 22. Each adjuster unit is identical in operation and has similar mechanisms comprising rotatable jack screws 23, 24, solenoid nut units 25, 26 to obtain horizontal adjustment upon actuation, and solenoid nut units 27, 28 to obtain vertical adjustment through linkages 29, 30 upon actuation. Therefore, only the adjuster unit 12 will be described in complete detail.

The flexible cable 16 may be drivingly connected to the adjuster unit 12 by means of a worm 31 and a worm gear 32 drivingly mounted on the end of screw 23 as shown in FIGURE 2. Energization of the reversible motor 15 by suitable controls causes rotation of the screw 23. The other end of the screw 23 is pivotally supported relative to the vehicle floor by the solenoid nut unit 25 which is pivotally mounted on a bracket 33. When the nut unit is clutchably engaged and held relative to the screw, the screw is moved axially relative to the nut unit and hence provides for horizontal fore and aft adjustment of the seat. The nut unit is preferably selectively clutchably held relative to the screw by means of the solenoid unit 34 which is energizable by actuation of remotely located switch means adjacent the vehicle operator. Movement of the screw 23 relative to the nut unit is limited by spaced stops 36, 37.

In order to provide for vertical adjustment of the seat, the solenoid nut unit 27, comprising solenoid unit 42 and nut unit 43, is mounted for axial movement along the screw between the solenoid nut unit 25 and the drive box 20. The solenoid unit 42 is adapted to clutchably engage and hold the nut unit 43 relative to the screw upon actuation of switch means located adjacent the vehicle occupant. The nut unit 43 is pivotally connected to vehicle seat 10 by linkage means 44 to impart vertical swinging movement to the vehicle seat as the nut unit 43 is axially displaced relative to the screw 23. Stops 46, 48 are provided to limit movement of the nut unit and prevent interference between the vertical and horizontal adjustment mechanisms.

The solenoid nut units 25, 27 are identical in construction and the details of each unit may be understood by reference to FIGURE 3. A nut member 50, in the form of an annular member continuously threadably engaged with the screw 23, is freely rotatably mounted within a housing 52 and is also fixedly secured within the housing against axial movement relative thereto. Selectively clutchable means are provided to selectively rotatively secure the nut 50 relative to the housing 52. To this end, a detent means is formed on the nut 50 by a radially outwardly extending abutment 62 in the preferred embodiment. It is to be noted that the circumferential length of the abutment is quite small and extends circumferentially over only a small portion of the nut 50. The width or length of the abutment need only be long enough to provide sufficient strength in use and to positively engage the associated clutch mechanism as hereinafter described. It may be seen that the circumferential length of the abutment may be approximately equal to or even less than the cooperating detent means formed by a non-magnetic ball 63 and a ball 64 abuttingly aligned with a plunger 66 of the solenoid 42.

Although a preferred detent arrangement is shown, other detent arrangements may also be used. For example, the abutment 62 may be replaced by a slot or groove arrangement whereby the outer periphery of the nut 50 would be substantially coextensive with the outer surface of the abutment 62 and extend completely around the nut except for the formation of a groove or slot 67 to receive the end 64 of the plunger as shown in FIGURE 5. In any event, energization of solenoid coil 68 is adapted to move the plunger detent means into holding engagement with the detent means 62 or 67 to prevent rotation of the nut relative to the housing. When the coil 68 is de-energized, a spring 70 returns the plunger to an uppermost position radially spaced from the detent means and permitting free rotation of the nut relative to the housing.

Control means are associated with each nut unit to limit actuation of the adjuster units to times when the nut 50 has a predetermined relationship relative to the screw and the housing. In the illustrative embodiment, the control means are integrated with the solenoid unit in a manner requiring a minimum number of parts conserving space and providing positive control response to seat adjuster position. A pair of contacts 72, 74 are mounted on an upwardly extending stem 76 and crossbar member 77. When the plunger is in its lowermost position, the contacts 72, 74 are adapted to engage fixed contacts 78, 80 and complete a control circuit for a purpose to be hereinafter described. In all other positions of the plunger 66, spaced above the lowermost position, the contacts 72, 74 do not engage the contacts 78, 80.

Referring now to FIGURE 4, a control system for the illustrative spaced adjuster units having screws 23, 24 and solenoid nut units 25, 26, 27, 28, as hereinbefore described, are shown in electrical circuit with the motor 15 and a source 90. In operation, as previously described, the adjuster units are adapted to be operated simultaneously to obtain uniform movement of both sides of the seat in the direction desired. Actuation of a particular adjuster component is controlled by the vehicle operator through double throw double pole switches 104, 106.

Actuation of switch 104 to the left in FIGURE 4 will cause energization of the solenoid nut units 25, 26 and horizontal adjustment of the seat in one direction. Actuation of switch 104 in the opposite direction will also cause energization of the solenoid nut units and horizontal adjustment in the opposite direction. Actuation of switch 106 in one direction will cause energization of the solenoid nut units 27, 28 and vertical movement of the seat in one direction. Actuation of the switch 106 in the opposite direction will also energize the solenoid nut units and cause vertical movement of the seat in the opposite direction. The solenoids of the units 25, 26, for controlling horizontal movement of the seat, are connected in series by a control circuit comprising lines 107, 108, 109, 110 to ground at 111 for simultaneous energization when the control switch 104 is closed. Similarly, solenoids of the units 27, 28, for controlling vertical movement of the seat, are connected in series by a control circuit comprising lines 112, 113, 114, 115 to ground at 116 and are energized upon closure of the switch 106. The reversible motor 15 is also energized each time one of the switches 104, 106 is closed through lines 117 or 118 to energize either motor coil 120 or 122 and drive the screws 23, 24 of the adjuster units by rotation of the motor armature 124 in one direction or the other. The motor circuit is completed through a line 126 and a line switch 128 or a shunt circuit 130 to ground at 132. Control means operable in accordance with seat adjuster mechanism positions are provided to actuate the switch 128 to a closed position when the adjuster mechanism is in a predetermined condition. The control means comprise, in the preferred arrangement, a solenoid 134 operatively connected to the switch 128 to close the switch each time the solenoid 134 is energized. Energization of the solenoid is controlled by separate control circuits. Energization of one control circuit is controlled by position of the horizontal movement components of the seat adjusters and energization of the other control circuit is controlled by position of the vertical movement components of the seat adjusters. In this manner, the solenoid 134 and the switch 128 are actuated in response to seat adjuster component position and energization of the motor 15 through switch 128 and actuation of the seat adjusters is dependent upon alignment between corresponding seat adjuster components.

The horizontal movement control circuit comprises a line 136, contact bridge 138 of the solenoid nut unit 25, a line 140, contact bridge 142 of the solenoid nut unit 26, a line 144, a line 145, coil 146 of solenoid 134, and a line 147 to the ground 132. The vertical movement control circuit, similarly, comprises a line 148, contact bridge 149 of the solenoid nut unit 27, a line 150, contact bridge 151 of the solenoid nut unit 28, a line 152, and the lines 145, 146, 147 to ground 132. The solenoid 134 is further provided with a conventional type holding device 154 comprising a capacitor 156 and a resistance 158 for a purpose to be hereinafter described in detail.

A feature of the control system is the resistor circuit 130 which is connected across the switch 128 and is electrically balanced with the field coils and the motor 14 to produce just enough flux to barely actuate the adjuster mechanism screws even if the switch 128 is open for a purpose to be hereinafter described.

In operation, assuming normal conditions and alignment of the adjuster mechanisms, horizontal adjustment of the seat is obtained by connecting the source to lines 117 or 118 and line 108 through switch 104. Vertical adjustment is obtained by connecting the source to lines 117 or 118 and line 113 through switch 106. In order to condition the adjuster mechanism for operation, the nuts are clutchably held relative to the screws by simultaneous energization of the coils of the solenoids 25, 26 or 27, 28 through the solenoid circuits. Since normal operating conditions are assumed, energization of the coils of the solenoids results in full movement of the plungers to locate the detent means in holding engagement with the nuts and to bridge the solenoid control circuits. When one of the control circuits is energized, solenoid 134 is energized and the main switch 128 is closed to energize the motor circuit and actuate the screws resulting in seat adjustment as desired.

In operation of the seat adjusting apparatus, it is possible for the nuts to become misaligned relative to one another. Consequently, it is desirable to provide means to positively position the solenoid nuts so that they will be in exact alignment with one another. In the preferred embodiment, two separate means for adjusting the position of the solenoid nuts are provided with usable separately or together to insure alignment of the seat adjuster mechanism.

One of the alignment means is operative at the beginning of an adjustment cycle initiated by actuation of the switching means 104, or 106. The alignment means prevents normal adjustment actuation of the seat adjuster mechanism until the adjuster apparatus is aligned. To this end, position indicating means are provided at each nut solenoid to indicate when the nuts are in a predetermined position and have a predetermined relationship to one another. In the preferred embodiment, the indicating means comprises the contact bridge operable by each solenoid and detent means provided on the nuts to prevent full extension of the plungers until a predetermined detent position is attained.

Consequently, each set of movable bridge contacts 72, 74 are not engageable with the fixed contaccts 78, 80 until the plunger is fully extended as shown in FIGURE 3. As may be seen by referring to FIGURE 4, the control circuits 108–109–110–111 or 113–114–115–116 cannot be energized until both bridges 138, 142 or 149, 151 connect the associated lines. Thus, until such time as both nuts causing similar adjusting movement, horizontal or vertical, have attained predetermined positions relative to the jack screws, the control circuits cannot be energized and consequently the coil 146 of the solenoid 134 will remain de-energized and the main motor control switch 128 will remain open.

In order to provide positive synchronization and alignment of the adjuster mechanisms prior to normal operation of the seat adjuster unit, the motor circuit is also connected to the ground connection 132 through the resistance shunt circuit 130. The resistance of the shunt circuit is balanced electrically with the field coils 120, 122 of the motor to permit the jack screws to be very slowly turned under load. The movement of the jack screws is just sufficient to turn the misaligned nut or nuts until the detent portions are aligned and the plunger or plungers can be fully extended. If, for example, one of the horizontal movement nuts is misaligned and one is not misaligned, the plunger detent of the aligned nut will be seated properly relative to the detent portion of the nut to hold the nut during corrective movement of the screws. Simultaneously, the other nut, which is misaligned, will be rotated with the screws until the nut detent means is moved into proper position relative to the plunger. Immediately upon proper alignment of the nuts, the control circuit will be completed and the solenoid 134 will be energized to close the switch 128 and connect the motor to the ground connection 132 for normal adjusting operation of the apparatus.

During normal operation of the seat adjuster apparatus, at or near the extremities of vertical or horizontal adjustment, the nuts sometimes become misaligned because one reaches the extreme position of operation slightly before the other. At such times, one nut will engage one of the abutments 36, 37 or 46, 48 and further movement of the nut or the screw is prevented. The unit at the end of the adjustment range may be subject to sufficient force to cause the solenoid plunger to be moved. Movement of the plunger will de-energize the control circuit, and, if no other means are provided, will de-energize the solenoid 134 and open switch 128. In order to enable both adjustment mechanisms to both reach the extreme positions of adjustment, the holding device 154 is adapted to store enough energy to continue to energize the solenoid 134, after the control circuit has been de-energized, until the lagging adjustment mechanism reaches the corresponding extreme position of adjustment. In common practice, the lag or lead of one adjustment mechanism relative to the other will not be more than a few revolutions at most and consequently the holding circuit need be adapted to maintain the switch 138 closed for only a short time period.

Although the broad inventive principles hereinbefore disclosed may be equally well utilized with a plurality of seat adjuster designs and with a variety of solenoid nut arrangements, one specific feature of the present invention is the design of the detent means on the nut 50. As shown in phantom, FIGURE 3, prior art nuts 50 have been provided with an annular periphery having a radially inwardly extending groove 67 forming a detent slot or seat for the plunger ball 64. Consequently, all of the nut periphery, except the slot 67, prevents full extension of the plunger when the solenoid is energized. Consequently, the chances of the plunger being misaligned relative to the slot 67 are maximized.

As an alternative and preferred form of holding arrangement, the slot 67 is replaced by the radially outwardly extending holding nib or detent 62. Consequently, the diameter of most of the periphery of the nut 60 permits full extension of the plunger. Holding engagement with the nut is obtained when the detent 62 is located at either side of the plunger depending upon direction of rotation of the associated screw. In this manner, the frictional engagement of the plunger with the surface of the nut is eliminated and the continual hunting of the plunger for the relatively small peripheral area of the slot is also eliminated. The plunger is fully extended in almost all positions of the nut and contact breaking engagement with the detent is obtained across the small peripheral area of nib 62. Accordingly, the control circuits for the solenoid 134 will remain energized a far greater percentage of the time and the holding device 154 will be needed a far smaller percentage of the time than with a nut of conventional design. Any slight misalignment attained during within one revolution of the nut to locate the nib 62 from one side of the plunger tip 64 to the other during reverse rotation of the screws can be accommodated within normal manufacturing tolerances. Of course, if more accurate control of the relative positions of the nuts is desired, the nut holding arrangement can be varied as desired between the two extremes.

The subject control means are utilizable with varying arrangements of seat adjuster units and with alternative embodiments and modifications of the solenoid nut units. The inventive principles herein described are not intended to be limited to use with the specific seat adjuster apparatus disclosed and, consequently, the scope of the invention as defined by the appended claims is intended to include structural variations and modifications which embody the inventive principles.

I claim:

1. In a nut unit, nut means adapted to be rotatably mounted on jack screw means or the like and selectively operable thereon, nut holding means selectively movable to a position of engagement with the nut means to cause relative axial movement between the nut unit and the jack screw means, and detent means provided on said nut means to receive said holding means and prevent rotation of said nut means relative thereto, said detent means having a peripheral portion adapted to prevent movement of said holding means to said position, and said peripheral portion comprising only a small proportion of the total circumferential length of the periphery of said nut means in the path of said holding means during rotation of said nut means relative to said holding means.

2. The invention as defined in claim 1 and wherein said nut means comprises an annular outer surface located in alignment with said holding means, a radially outwardly extending nib provided on said surface, the diameter of said annular surface being less than the radial length of said nib by an amount sufficient to permit free movement of said nut means relative to said holding means except when engaged with said nib, and the radial length of said nib being sufficient to provide side surfaces to abut and engage said holding means and prevent relative movement of said nut means relative to said holding means during abutting engagement therewith.

3. The invention as defined in claim 1 and wherein said portion comprises less than ¼ of the circumferential length of the periphery of said nut means.

4. In a seat adjusting apparatus having jack screw means or the like, nut means selectively operably mounted on said jack screw means, selectively movable detent means movable from a first position permitting said nut means to ride freely on said jack screw means to a second position holding said nut means relative to said jack screw means to cause axial movement therebetween; the improvement comprising control means operable by the selectively movable detent means for controlling operation of said seat adjusting apparatus and preventing normal adjusting actuation of said seat adjusting apparatus until said nut means acquires a predetermined position relative to said holding means.

5. The invention as defined in claim 4 and wherein said control means comprises control circuits for selectively actuating said seat adjusting apparatus, switch means controlling energization of said control circuits, and switch actuating means operably connected to said holding means and operable during movement of said holding means between said first position and said second position to close said switch means.

6. In a seat adjuster arrangement for variably positioning a vehicle seat or the like, a plurality of spaced adjuster units, said adjuster units having similar operating parts adapted to impart similar movements to said seat, actuating means for selectively simultaneously operating said similar mechanisms to obtain adjustment of said seat, and control means to adjust the relative positions of said operating means prior to initiation of an adjustment cycle of said vehicle seat to obtain operational alignment of said adjuster units.

7. The arrangement as defined in claim 6 and wherein said control means further comprises means operative at the ends of the range of seat adjustment to cause each adjuster unit to continue to operate until each adjuster unit reaches a similar position at the ends of the range of seat adjustment.

8. In an electrically operated seat adjuster arrangement comprising spaced adjuster units adapted to variably position a vehicle seat or the like, each adjuster unit comprising jack screw means and associated jack nut means axially movable relative to one another, actuating means to selectively axially displace said jack nut means relative to said jack screw means, electrically operated means for selectively operating said actuating means, a control circuit for said electrically operated means comprising: means to rotatively energize said jack screw means, means to operably connect said jack nut means on said jack screw means and means to prevent normal energization of said jack screw means until said jack nut means have attained predetermined relative positions.

9. In a control circuit for seat adjuster mechanism for variably positioning a vehicle seat, or the like, comprising: spaced adjuster units having similar operational mechanisms adapted to impart uniform adjusting movement to the seat, an electric motor for actuating said adjuster unit, a control circuit for selectively energizing said motor, clutch means to drivingly connect said motor means to said seat adjuster mechanism, and control circuit means including said clutch means to prevent actuation of said seat adjuster mechanism until said clutch means is in a predetermined position relative to said operational mechanisms.

10. Control apparatus for spaced seat adjuster units, each seat adjuster unit having drive means, vertical movement means engageable with said drive means, and horizontal movement means engageable with said drive means, comprising: motor means operatively connected to said drive means, switch means to selectively energize said motor means, a first control means for said drive means movable between a motor energizing position and a motor de-energizing position and a second control means for said drive means operative in the motor de-energizing position of said first control means to actuate said drive means until said first control means reaches said motor energizing position.

References Cited by the Examiner
UNITED STATES PATENTS

| 2,818,744 | 1/58 | Moody | 74—424.8 |
| 2,857,776 | 10/58 | Williams et al. | 74—424.8 |
| 2,929,438 | 3/60 | Homier | 248—421 |

CLAUDE A. LE ROY, *Primary Examiner.*

UNITED STATES PATENT OFFICE
CERTIFICATE OF CORRECTION

Patent No. 3,194,530                                          July 13, 1965

Russell G. Heyl, Jr.

It is hereby certified that error appears in the above numbered patent requiring correction and that the said Letters Patent should read as corrected below.

Column 1, line 36, for "obtained" read -- obtain --; column 4, line 71, for "with" read -- and --; column 5, line 13, for "contaccts" read -- contacts --.

Signed and sealed this 19th day of April 1966.

(SEAL)
Attest:

ERNEST W. SWIDER                                      EDWARD J. BRENNER
Attesting Officer                                          Commissioner of Patents